(12) United States Patent
Tanaka et al.

(10) Patent No.: US 7,822,307 B1
(45) Date of Patent: Oct. 26, 2010

(54) OPTICAL FIBER RIBBON FOR WIRING OF EQUIPMENT AND CONNECTOR-ATTACHED OPTICAL FIBER RIBBON FOR WIRING OF EQUIPMENT

(75) Inventors: Kazunori Tanaka, Yokohama (JP);
Kazumasa Oishi, Yokohama (JP);
Tomoyuki Hattori, Yokohama (JP);
Tetsuya Haruna, Yokohama (JP);
Wataru Sakurai, Yokohama (JP);
Mitsuaki Tamura, Yokohama (JP);
Kazuto Saito, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 17 days.

(21) Appl. No.: 12/419,742

(22) Filed: Apr. 7, 2009

(51) Int. Cl.
G02B 6/44 (2006.01)
(52) U.S. Cl. .................. 385/114; 385/100
(58) Field of Classification Search ............. 385/114
See application file for complete search history.

(56) References Cited

U.S. PATENT DOCUMENTS 7,135,229 B2 * 11/2006 Tortorello et al. ......... 428/378

2002/0154873 A1 * 10/2002 Sheu ..................... 385/114
2005/0013573 A1 * 1/2005 Lochkovic et al. ......... 385/128

FOREIGN PATENT DOCUMENTS

| JP | 02-151821 | 6/1990 |
|---|---|---|
| JP | 2003-095706 | 4/2003 |

* cited by examiner

Primary Examiner—Rhonda S Peace
(74) Attorney, Agent, or Firm—McDermott Will & Emery LLP

(57) ABSTRACT

When a glass fiber and an inner fiber coating layer are to be attached to a connector by removing an outer fiber coating layer while leaving the inner fiber coating layer as it is, a collective coating and the outer fiber coating layer can be removed at a stretch so that the inner fiber coating layer can easily and satisfactorily be exposed. In the ultraviolet curable resin coating layer of a coated optical fiber 17 of an optical fiber ribbon 11 for wiring of equipment, the inner fiber coating layer 15 has a Young's modulus of 600 MPa to 1000 MPa, and the outer fiber coating layer 16 has a Young's modulus of 10 MPa to 300 MPa. The material of the outer fiber coating layer 16 is made by mixing 100 weight parts of base resin, 1-30 weight parts of silicone-based additive, and 0.5 to 40 weight parts of long chain fatty acid ester compound, wherein the base resin is a material made of a urethane metha acrylate oligomer, a mono-functional or multi-functional reactive dilution monomer, and an optical initiator.

4 Claims, 2 Drawing Sheets

FIG. 3

| | Ex. 1 | Ex. 2 | Ex. 3 | Ex. 4 | Ex. 5 | Ex. 6 | Ex. 7 | Compar. Ex. 1 | Compar. Ex. 2 | Compar. Ex. 3 | Compar. Ex. 4 |
|---|---|---|---|---|---|---|---|---|---|---|---|
| Base resin | 100 | 100 | 100 | 100 | 100 | 100 | 100 | 100 | 100 | 100 | 100 |
| Polyorganosiloxiane having a vinyl group terminus | 20 | 1 | 30 | 20 | 20 | 20 | - | 0.5 | 40 | 20 | 20 |
| Polyorganosiloxane having trimethylsilyl terminus | - | - | - | - | - | - | 20 | - | - | - | - |
| Octyl epoxystearate | 30 | 30 | 30 | 0.5 | 40 | - | 30 | 30 | 30 | 0.1 | 50 |
| Glycerine acetic fatty acid ester | - | - | - | - | - | 40 | - | - | - | - | - |
| Young's modulus Outer fiber coating (MPa) | 180 | 200 | 150 | 290 | 50 | 20 | 190 | 220 | 140 | 350 | 5 |
| Simultaneous removal of coatings | Good | Good | Good | Good | Good | Good | Good | Poor | Good | Poor | Poor |
| Pistoning | Good | Good | Good | Good | Good | Good | Good | Good | Poor | Good | Poor |
| Adhesion | 0.1 | 0.18 | 0.08 | 0.17 | 0.06 | 0.15 | 0.1 | 0.25 | 0.03 | 0.2 | 0.04 |
| Splicing loss (dB) | <0.2 | | | | | | | <0.2 | 0.4 | 0.25 | 0.28 |

OPTICAL FIBER RIBBON FOR WIRING OF EQUIPMENT AND CONNECTOR-ATTACHED OPTICAL FIBER RIBBON FOR WIRING OF EQUIPMENT

BACKGROUND OF THE INVENTION

1. Field of the Invention

The present invention relates to an optical fiber ribbon for wiring of equipment and a connector-attached optical fiber ribbon for wiring of equipment.

2. Description of the Background Art

The optical fiber ribbon is made by arranging a plurality of coated optical fibers in parallel and covering them with a collective coating so as to make an integral ribbon-like form. Japanese Patent Application Publication No. 2003-95706 describes coated optical fibers contained in an optical fiber ribbon. The coated optical fiber is such that the outer circumferential surface of a glass fiber is coated with two layers made of ultraviolet curable resin: an inner fiber coating layer and an outer fiber coating layer. The inner fiber coating layer has Young's modulus of about 1.2 MPa, and the outer fiber coating layer has Young's modulus of about 700 to 750 MPa, and the outer fiber coating layer is harder than the inner fiber coating layer. In this optical fiber ribbon, the glass fiber can be exposed by removing the inner fiber coating layer and the outer fiber coating layer together with the collective coating. When a coated optical fiber is attached to a connector, generally the glass fiber is bared to be fixed to the connector.

Japanese Patent Application Publication No. H 2-151821 discloses an optical fiber that is coated with two layers: an inner fiber coating layer made of acrylate fluoride and an outer fiber coating layer made of silicone resin. This optical fiber can be fixed to a connector in the condition where the outer fiber coating layer only is removed while the inner fiber coating layer remains as it is. In this manner, it is possible to prevent the glass fiber from being damaged, and hence the degradation of the transmission characteristics and mechanical strength can be avoided.

However, in the case of an optical fiber ribbon, in which such a kind of coated optical fibers as disclosed by Japanese Patent Application Publication No. H 2-151821 are further covered with a collective coating, the attempt to remove the outer fiber coating layer together the collective coating will often result in failure: it is difficult to pull out the outer fiber coating layer in a clean layer condition, that is, the residues of the silicone resin might be left on the inner fiber coating layer. This is because the silicone resin is fragile.

SUMMARY OF THE INVENTION

The object of the present invention is to provide an optical fiber ribbon for wiring of equipment and an optical fiber ribbon attached to connector for wiring of equipment. In the optical fiber ribbon of the invention, the inner fiber coating layer can easily and satisfactorily be exposed by removing the collective coating and the outer fiber coating layer at a stretch.

To achieve the object, the optical fiber ribbon for wiring of equipment is formed in a ribbon-like shape such that a plurality of coated optical fibers are arranged in parallel and coated as a whole with a collective coating made of ultraviolet curable resin, wherein each coated optical fiber has an inner fiber coating layer and an outer fiber coating layer, which are made of ultraviolet curable resin, and the Young's modulus of the inner fiber coating layer is 600 MPa or more and 1000 MPa or less, and the Young's modulus of the outer fiber coating layer is 10 MPa or more and 300 MPa or less; the outer fiber coating layer is a material made by mixing 100 weight parts of base resin, 1-30 weight parts of silicone-based additive, and 0.5 to 40 weight parts of long chain fatty acid ester compound, wherein the base resin is a material made of urethane acrylate oligomer or urethane metha acrylate oligomer, a mono-functional or multi-functional reactive dilution monomer, and an optical initiator.

In addition, provided is a connector-attached optical fiber ribbon, which is made by attaching a connector to the optical fiber ribbon of the present invention. In the connector-attached optical fiber ribbon, a plurality of through-holes having a diameter that is substantially equal to the outer diameter of the inner fiber coating layer of the coated optical fiber are provided at one end side of the connector, and a fitting part for fixing an optical fiber ribbon is provided at the other end side, wherein the outer fiber coating layer of each coated optical fiber and the collective coating that constitutes an optical fiber ribbon are peeled off altogether, and the inner fiber coating layer and the silica glass fiber of each coated optical fiber are integrally inserted into the respective through-holes, and the optical fiber ribbon is fixed to the fitting part of the connector.

BRIEF DESCRIPTION OF THE DRAWINGS

FIG. 3 is a table showing the mixing ratios of additives added to base resins in Examples and Comparative Examples, and the respective evaluation results.

DETAILED DESCRIPTION OF THE INVENTION

Figure 1:
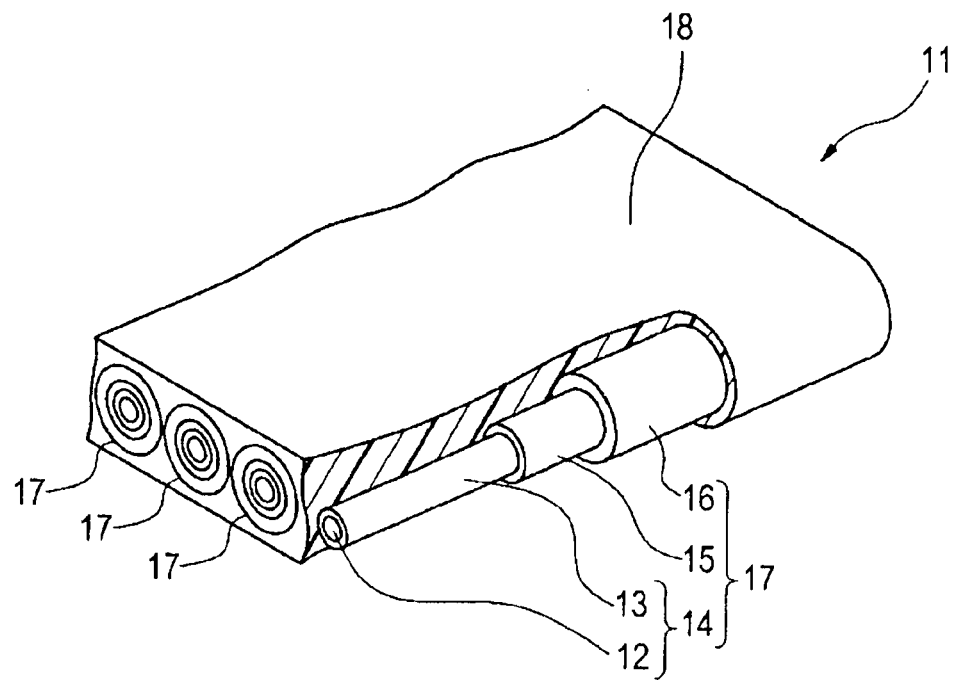
FIG. 1 is a partially cut-away perspective view showing the embodiment of an optical fiber ribbon for wiring of equipment relating to the present invention.

In the following, preferred embodiments of the present invention will be described in detail with reference to the accompanying drawings. The same reference numerals denote the same parts, and a repeated explanation will be omitted. The ratios of dimensions in the drawings do not always exactly correspond to the description.

FIG. 1 is a partially cut-away perspective view showing an optical fiber ribbon 11, which is an embodiment of the present invention. The optical fiber ribbon 11 has a plurality (e.g., 12 pieces) of coated optical fibers 17, which are arranged in parallel, and a collective coating 18, which is made of ultraviolet curable resin and unites the coated optical fibers 17 altogether in a ribbon-like form. Each coated optical fiber 17 is formed such that the outer circumference of a silica glass fiber 14 consisting of a core 12 and a cladding 13 is coated with an inner fiber coating layer 15 and an outer fiber coating layer 16, which are made of ultraviolet curable resins. The optical fiber ribbon 11 is suitable for wiring of equipment (for inter-connection) as described later.

First, a method of manufacturing the optical fiber ribbon 11 will be described. The manufacturing method of the optical fiber ribbon 11 includes a step of making a resin solution, a coating step, and a cabling step.

In the step of making the resin solution, first, an oligomer (prepolymer) is synthesized. A predetermined amount of isocyanate (TDI, etc.) and diol (PPG, etc.) are addition polymerized. The resultant product and an acryloyl group-containing monomer (2-HEA, etc.) are subjected to polycondensation reaction to complete the intended oligomer synthesis. Next, the blending of the resin solution is conducted. The oligomer prepared as described above is mixed with a plural kinds of monomers (N-VC, isobornyl acrylate, etc.) and an optical initiator (phosphorus-based optical initiator: TPO, etc). The resultant mixture is further mixed with various additive agents (silicone-based additive, silane coupling agent, long chain fatty acid ester compound, etc.).

Here, the resin solution to become an inner fiber coating layer 15 is an ultraviolet curable resin solution which comprises a base resin material and additives: the base resin material includes 40-65 weight parts of urethane (metha) acrylate oligomer, 34.5-59 weight parts of mono-functional or multi-functional reactive dilution monomer, and 0.5 to 3 weight parts of optical initiator, and the additives are 0.1-5 weight parts of silane coupling agent, and 0.1-10 weight parts of silicone-based additive, respectively relative to 100 weight parts of the base resin material, wherein the silane coupling agent contains one or more alcohoxy groups and one functional group (i.e., any of mercapto group, methacryl group, epoxy group, and vinyl group), and wherein the silicone-based additive is composed of mono-functional or bifunctional silicone acrylate.

The resin solution to become an outer fiber coating layer 16 is an ultraviolet curable resin solution which comprises a base resin material including 30-85 weight parts of urethane (metha) acrylate oligomer, 69.5-12 weight parts of mono-functional or multi-functional reactive dilution monomer, and 0.5-3 weight parts of optical initiator, and which includes 1-30 weight parts of silicone-based additive, and 0.5-40 weight parts of long chain fatty acid ester compound, respectively relative to 100 weight parts of the base resin material.

Here, the silicone-based additive is polyorganosiloxane. The polyorganosiloxane is represented by chemical formula $YCH_3SiO(X_2SiO)_nSiCH_3Y$, wherein X is a functional group of either methyl or ethyl, and Y is a compound comprised of hydrogen atom, alkyl group or alkenyl group. More specifically, the silicone-based additives used are polyorganosiloxiane having a vinyl group terminus and polyorganosiloxane having trimethylsilyl terminus comprised of a methyl group. The polyorganosiloxane preferably has an average molecular weight of 1000 to 60000, and more preferably 5000 to 45000.

The long chain fatty acid ester compound is comprised of one or more kinds of long chain fatty acid ester compounds selected out of octyl epoxystearate, epoxisized linseed oil fatty acid butyl ester, glycerine acetic fatty acid ester, citrate ester, and the like. The average molecular weight of these long chain fatty acid ester compounds is preferably 500 to 100000, and more preferably 1000 to 60000. The silicone-based additive and the long chain fatty acid ester compound are not necessarily limited to those described above.

At the coating step, an inner fiber coating layer 15 and an outer fiber coating layer 16 are coated around the outer circumference of a silica glass fiber 14. The glass fiber 14, which is formed by drawing an optical fiber preform, has a core 12 of 50 μm or less and preferably 30 μm or more in diameter, and a cladding 13 of 100 μm or less (e.g., 80 μm) in diameter, wherein fluorine (F) is added to the cladding 13 and the relative refractive index difference Δn between the core 12 and the cladding 13 is equal to or more than 1.2% (typically 1.9%).

More specifically, first, the resin solution for the inner fiber coating layer 15 is coated on the outer circumference of the glass fiber 14 and is UV-cured, and thereby a small-diameter single-coat optical fiber is formed. Here, the inner fiber coating layer 15 has a Young's modulus of 600 MPa or more and 1000 MPa or less in a state of hardened coating film, and the coating diameter of the inner fiber coating layer 15, that is, the outer diameter of the small-diameter single-coat optical fiber is 125 μm. Next, the resin solution for the outer fiber coating layer 16 is coated on the outer circumference of the inner fiber coating layer 15 and is UV-cured, and thereby the coated optical fiber 17 is formed. Here, the outer fiber coating layer 16 has a Young's modulus of 10 MPa or more and 300 MPa or less in a state of hardened coating film, and the coating diameter of the outer fiber coating layer 16, i.e., the outer diameter of the coated optical fiber 17 is 250 μm. The resin solution for the inner fiber coating layer 15 and the resin solution for the outer fiber coating layer 16 may be applied consecutively, and they may simultaneously be UV-cured altogether.

In the cabling step, the optical fiber ribbon 11 is made by arranging 12 pieces of the coated optical fibers 17 in parallel and uniting them into an integral ribbon-like form by applying an ultraviolet curable resin for the collective coating 18 and UV-curing it. In this case, the optical fiber ribbon 11 thus made has a thickness of about 290 μm.

In the optical fiber ribbon 11, each coated optical fiber 17 has an inner fiber coating layer 15 of 125 μm in outer diameter and an outer fiber coating layer 16 of 250 μm in outer diameter, whereas both fiber coating layers are made of ultraviolet curable resins. In particular, the material that constitutes the outer fiber coating layer 16 is a material which comprises a base resin including a urethane (metha) acrylate oligomer, a mono-functional or multi-functional reactive dilution monomer, and an optical initiator, and which also comprises 1-30 weight parts of silicone-based additive, and 0.5-40 weight parts of long chain fatty acid ester compound, respectively relative to 100 weight parts of the base resin.

Figure 2:
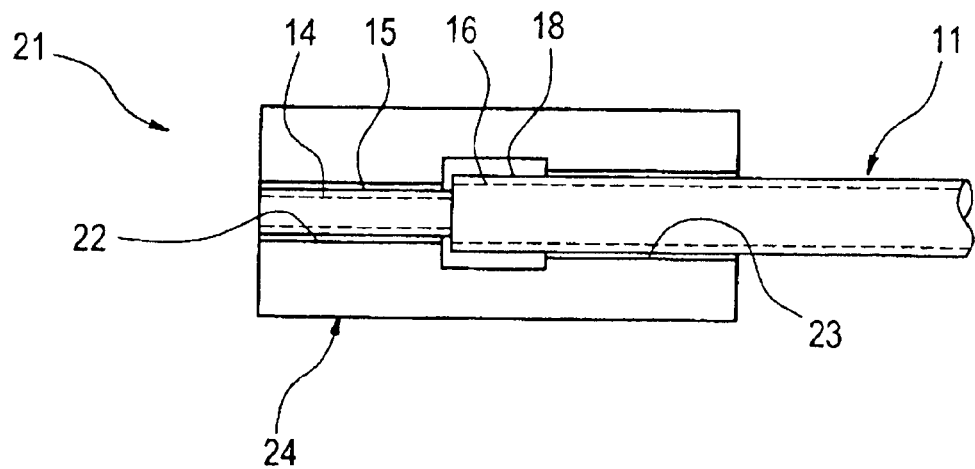
FIG. 2 is a sectional view showing an embodiment of the connector-attached optical fiber ribbon for wiring of equipment relating to the present invention.

FIG. 2 is a cross-sectional side view showing a connector-attached optical fiber ribbon 21, which is an embodiment of the present invention. Attachment of a connector 24 to the optical fiber ribbon 11 is conducted as follows. First, the connector 24 having an opening in which the optical fiber ribbon 11 is inserted is prepared. One end of the opening is structured as a plurality of through-holes 22 each having a caliber which is substantially equal to the outer diameter of the inner fiber coating layer 15 of the coated optical fiber 17, which is a constituent member of the optical fiber ribbon 11. The other end of the opening is shaped approximately similar to the external form of the optical fiber ribbon 11 and functions as a fitting part 23 for fixing the optical fiber ribbon 11.

Next, the collective coating 18 of the optical fiber ribbon 11 and the outer fiber coating layer 16 are simultaneously removed altogether so as to partially expose the inner fiber coating layer 15. Thus, each silica glass fiber 14 covered with the inner fiber coating layer 15 is inserted from the side of the fitting part 23 to the respective through-hole 22, whereas the optical fiber ribbon 11 is fixed to the fitting part 23 at the part covered with the collective coating 18. In this way, the connector-attached optical fiber ribbon 21 is obtained.

In order to attach a coated optical fiber to the connector in such a state as covered with the inner fiber coating layer, the outer fiber coating layer 16 must be capable of allowing easy removal while the inner fiber coating layer 15 is stuck to the glass fiber 14. The long chain fatty acid ester compound added to the outer fiber coating layer of the coated optical fiber 17 exhibits an effect like a plasticizing agent, swelling the outer fiber coating layer 16 to some degree. Since the quantity of the long chain fatty acid ester compound thus added is 0.5 to 40 weight parts relative to 100 weight parts of the base resin, the outer fiber coating layer 16 will not afford compression force to the inner fiber coating layer 16, allowing the easy removal of the outer fiber coating layer 16.

In that case, if the ratio of the long chain fatty acid ester compound is less than 0.5 weight parts, the swelling effect is hardly recognized. In such case, since the outer fiber coating layer compresses the inner fiber coating layer, the delamination that is a starting point in the coating removal will not be caused between the inner fiber coating layer 15 and the outer fiber coating layer 16. On the other hand, if the amount of the classy fat acid ester added to the outer fiber coating layer is 40 weight parts or more, the swelling effect reaches a saturated level. Moreover, if any part of the long chain fatty acid ester compound moves from the outer fiber coating layer 16 to the inner fiber coating layer 15, it will cause a swelling of the inner fiber coating layer 15, which will result in the decrease of sticking force between the glass fiber 14 and the inner fiber coating layer 15.

Also, since at least one or more kinds of silicone-based additives are added by the amount of 1 weight part or more to the outer fiber coating layer, the outer fiber coating layer 16 can slide on the inner fiber coating layer 15 to a suitable degree when the removal of the outer fiber coating layer 16 is done. The surface free energy of the outer fiber coating layer is small, and the silicone-based additive exists in the surface of the outer fiber coating layer 16 or the boundary between the outer fiber coating layer 16 and the inner fiber coating layer 15. Therefore, at the time of simultaneous removal of the collective coating 18 and the outer fiber coating layer 16, the inner fiber coating layer 15 can be prevented from suffering any damage which might otherwise be caused by such removal, and hence it is possible to prevent such damage from decreasing the adherence between the optical fiber and a ferrule or connector. In addition, when the coated optical fiber as covered with the inner fiber coating layer 15 is inserted into the through-hole or the ferrule of the connector, the outer fiber coating layer 16 can be prevented from leaving any residue thereof on the inner fiber coating layer 15, and hence no difficulty will arise in the insertion of such single-coat optical fiber into the through-hole or the ferrule of the connector.

On the other hand, if the silicone-based additive added is more than 30 weight parts, the friction between the outer fiber coating layer 16 and the inner fiber coating layer 15 will be insufficient such that, depending on the variation of ambient temperature, the inner fiber coating layer 15 and the glass fiber 14 might protrude from the outer fiber coating layer 16. In general, there are cases in which the end of the optical fiber ribbon 11 for wiring of equipment is directly butted against a photodetector. In such a case, if the small-diameter single-coat optical fiber part (the 125 μm diameter part) protrudes from the coated optical fiber, the photodetector might be damaged. Therefore, occurrence of such protrusion should be prevented. The optical fiber ribbon 11 of the invention enables restraining such occurrence.

Moreover, the ultraviolet curable resin used in the inner fiber coating layer 15 and the outer fiber coating layer 16 has excellent hardening property, and hence the productivity can be improved by enhancing the manufacturing line speed.

Furthermore, since the Young's modulus of the inner fiber coating layer 15 is in the range of 600 MPa to 1000 MPa, while the Young's modulus of the outer fiber coating layer 16 is in the range of 10 MPa to 300 MPa, the inner fiber coating layer 15 is harder, whereas the outer fiber coating layer 16 is softer. Accordingly, sufficient strength can be secured so that the glass fiber 14 may not be damaged by the hardness of the inner fiber coating layer 15 which is exposed at the time of attachment to the connector.

Here, if the Young's modulus of the inner fiber coating layer 15 is as small as 0.5 to 2.0 MPa at the normal temperature, the splicing loss will increase because of such displacement in the position of the glass fiber 14 as occurs inside the connector when the coated optical fibers 17 are butted each other or when the coated optical fiber 17 is butted against a photodetector. In contrast, if the Young's modulus of inner fiber coating layer 15 is sufficiently high at the normal temperature, the deformation of the coating will not be caused by the butting, and hence satisfactory splicing loss properties will be obtained. Since a silicone-based additive is added to the inner fiber coating layer 15, no adhesion with a connector, ferrule, or the like occurs thanks to the delamination effect of the silicon additive, and accordingly optical properties will not be degraded. Also, a cushioning effect against a lateral pressure can be provided with the comparatively soft outer fiber coating layer 16.

As mentioned above, the protrusion of the coated optical fiber should be prevented. For the purpose of easy removal of the outer fiber coating layer 16 as well as prevention of the protrusion of the inner fiber coating layer 15 including the silica glass fiber 14, it is more preferable to provide a predetermined mechanical property such that the adhesion between the outer fiber coating layer 16 and the inner fiber coating layer 15 be made 0.05 kgf or more and 0.20 kgf or less, by using a silicone-based additive composed of polyorganosiloxiane and an additive consisting of one or more kinds of long chain fatty acid ester compounds which are selected from the group of octyl epoxystearate, epoxisized linseed oil fatty acid butyl ester, glycerine acetic fatty acid ester, and citrate ester, etc.

As for the silica glass fiber 14, the coupling efficiency with the light source improves, since the relative refractive index difference Δn between the core 12 and the cladding 13 is equal to or more than 1.2%.

EXAMPLES

FIG. 3 is a table showing the mixing ratios of additives added to the base resins of the outer fiber coating layers and the respective evaluation results in Examples 1 to 7 and Comparative Examples 1 to 4. The optical fiber ribbons (Examples 1 to 7 and Comparative Examples 1 to 4) covered with the resins having the compositions shown in FIG. 3 are prepared and the respective characteristics are evaluated. In a glass fiber included in an optical fiber ribbon, the relative refractive index difference Δn of the core 12 and the cladding 13 is 1.9%. The resins are made by adding the additives described in the table to the base resin, which is made from 84 wt % of oligomer, 5 wt % of monomer 1 (N-vinyl caprolactam), 5 wt % of monomer 2 (isobornyl acrylate), 5 wt % of monomer 3 (2-hydroxypropyl acrylate), and 1 wt % of optical initiator (Lucirin TPO), whereas the oligomer is prepared by mixing polypropylene glycol (PPG) having a number average molecular weight of 3500, toluene-diisocyanate (TDI), and 2-hydroxylethyl acrylate (2-HEM at the ratio of 1:2:2 by resin synthesis (dehydration polymerization reaction).

[Evaluation of Young's Modulus]

Pulling tests of optical fiber ribbons are conducted according to JISK7113 at a pulling speed of 1 mm/minute. The evaluation samples are prepared by immersing fibers in MEK and swelling them, and taking out the pipe-like coating parts only, separating the inner fiber coating layer 15 (single-coat layer) and the outer fiber coating layer 16 (OVC layer). Thereafter, the samples thus prepared are pulled with a pulling test machine. Their Young's modulus values differ depending on the quantities of the silicone-based additives and the long chain fatty acid ester compounds which are added to the outer fiber coating layer.

[Evaluation by Simultaneous Removal of Coatings from Optical Fiber Ribbons]

The collective coatings 18 (tape materials) and the outer fiber coating layers 16 (OVC layers) are removed altogether from optical fiber ribbons, using a thermal remover JR-5 (a jacket-remover used for a small-diameter indoor cable) made by Sumitomo Electric Industries, Ltd. The condition of the coating removal is 100° C.×3 seconds. The evaluation is conducted as follows: the test results are judged to be poor when the collective coating 18 and the outer fiber coating layer 16 become crumbled or when any delamination occurs inside the inner fiber coating layer 15 (single-coat layer) at the time of the inner fiber coating layer 15 being exposed; and the tests results are judged to be satisfactory when the inner fiber coating layer 15 (single-coat layer) is exposed with a moderate force without crumbling the collective coating 18 and the outer fiber coating layer 16.

[Evaluation of Pistoning]

The optical fiber ribbons are subjected to heat shock tests of −40 to 125° C. The time held under −40° C. and 125° C. is 30 minutes, and the temperature switch from −40° C. to 125° C. is instantaneously accomplished. Cut samples, which are prepared with their end faces being sufficiently clean without any burrs, are laid under the respective test environments. The above heat shock tests are repeated 100 times, and the protrusion of the glass fiber 14 or the single-coat fiber having the inner fiber coating layer 15 is measured using an electronic microscope or the like. If the protrusion quantity is smaller than 30 μm, the pistoning is judged to be acceptable, and if the protrusion quantity is 30 μm or more, the pistoning is judged to be unacceptable.

[Adhesion Measurement]

The adhesion between the inner fiber coating layer 15 and the outer fiber coating layer 16 is measured in a similar manner as the pull-out evaluation of the optical fiber. An optical fiber ribbon 11 is adhered and fixed to fixing tools of the pulling test machine using an adhesive at both end portions each of which has a length of about 10 mm, and a cut gap is provided (to such a degree as the cut by a knife does not reach the inner fiber coating layer 15) at a part between the fixed points. The fixing tools are moved to go away from each other such that a small-diameter single-coat optical fiber (125 μm diameter) is pulled out from the outer fiber coating layer 16, at a pulling speed of 10 mm per minute.

[Splicing Loss]

The splicing loss is measured for optical fibers which are inserted in a ferrule under the conditions in which both ends thereof are covered with an inner fiber coating layer. The loss is measured by continuous monitoring at temperatures of −40 to 125° C. for 100 cycles.

In Examples 1 to 7, in which the optical fiber ribbon has an inner fiber coating layer 15 having Young's modulus of 600 MPa to 1000 MPa and which exhibits acceptable pistoning and excellent simultaneous coating removability as well as low splicing loss, the Young's modulus of the outer fiber coating layer 16 is 20 to 290 MPa, and the adhesion between the outer fiber coating layer 16 and the inner fiber coating layer 15 is 0.06 to 0.18 kgf (FIG. 3).

In contrast, in Comparative examples 1 to 4, there is a problem with respect to any of the simultaneous coating removability, pistoning, and splicing loss. In Comparative Example 1, since the quantity of the added silicone-based additive is too little, the coating removal is difficult. In Comparative example 2, since the quantity of the added silicone-based additive is too much, pistoning is unacceptable. Also, the splicing loss is rather large, presumably due to the protrusion of the coated optical fiber. In Comparative Example 3, the Young's modulus of the outer fiber coating layer 16 is too large to be cut by knife, and because the quantity of the added long chain fatty acid ester compound is too little, the coating removal is difficult to accomplish. In Comparative Example 4, since the quantity of the added long chain fatty acid ester compound is too much, the outer fiber coating layer becomes crumbled, which results in poor performance of the simultaneous coating removal. Also, the outer fiber coating layer and the inner fiber coating layer slide, making the pistoning unacceptable, and the splicing loss is large.

From the above, it is understood that the optical fiber ribbon 11 exhibits not only superior simultaneous removability of the collective coating 18 and the outer fiber coating layer 16, but also acceptable pistoning and low splicing loss, if the optical fiber ribbon 11 has the following characteristics: the core 12 has a diameter of 50 μm and the cladding 13 has a diameter of 100 μm or less; the cladding 13 is doped with fluorine and the relative refractive index difference between the core 12 and the cladding 13 is 1.2% or more; the inner fiber coating layer 15 of 125 μm diameter and the outer fiber coating layer 16 of 250 μm diameter are made of ultraviolet curable resin; the material that constitutes the outer fiber coating layer 16 is a material which comprises a base resin including an optical initiator, a urethane (metha) acrylate oligomer, and a mono-functional or multi-functional reactive dilution monomer, and which also comprises 1-30 weight parts of silicone-based additive, and 0.5-40 weight parts of long chain fatty acid ester compound, respectively relative to 100 weight parts of the base resin; the Young's modulus of the outer fiber coating layer 16 is 10 MPa or more and 300 MPa or less; and the adhesion between the outer fiber coating layer 16 and the inner fiber coating layer 15 is 0.05 kgf to 0.20 kgf.

The present patent application is based on Japanese patent application No. 2008-011309 filed on Jan. 22, 2008, and its contents are incorporated herein by reference.

What is claimed is:

1. An optical fiber ribbon for wiring of equipment, the optical fiber ribbon being formed in a ribbon-like shape such that a plurality of coated optical fibers are arranged in parallel and coated as a whole with a collective coating made of ultraviolet curable resin, wherein each coated optical fiber has an inner fiber coating layer and an outer fiber coating layer, each made of ultraviolet curable resin, the Young's modulus of the inner fiber coating layer being in the range of 600 MPa to 1000 MPa, the Young's modulus of the outer fiber coating layer being in the range of 10 MPa to 300 MPa; and wherein the outer fiber coating layer is a material made by mixing 100 weight parts of base resin, 1-30 weight parts of silicone-based additive, and 0.5 to 40 weight parts of long chain fatty acid ester compound.

2. An optical fiber ribbon according to claim 1, wherein the silicone-based additive is polyorganosiloxiane and the long chain fatty acid ester compound is a long chain fatty acid ester compound selected from the group of octyl epoxystearate, epoxisized linseed oil fatty acid butyl ester, glycerine acetic fatty acid ester, and citrate ester.

3. An optical fiber ribbon according to claim 2, wherein the adhesion between the outer fiber coating layer 16 and the inner fiber coating layer 15 is 0.05 kgf or more and 0.20 kgf or less.

4. A connector-attached optical fiber ribbon, comprising a connector and an optical fiber ribbon set forth in any one of claims 1 to 3, wherein the connector has a plurality of through-holes provided at one end side of the connector and a fitting part provided at the other end side, the through-holes having an caliber substantially equal to the outer diameter of the inner fiber coating layer of the coated optical fiber, the fitting part being used for fixing an optical fiber ribbon, and wherein the optical fiber ribbon is fixed to the fitting part by peeling off the outer fiber coating layer and the collective coating altogether, and inserting the inner fiber coating layer and the silica glass fiber of the coated optical fiber integrally in the respective through-holes.

* * * * *